US006477650B1

(12) United States Patent
Kokubo

(10) Patent No.: US 6,477,650 B1
(45) Date of Patent: Nov. 5, 2002

(54) DATA PROTECTING SYSTEM AND METHOD FOR PROTECTING DATA

(75) Inventor: Kenichi Kokubo, Tokyo (JP)

(73) Assignee: NEC Corp. (JP)

( * ) Notice: Subject to any disclaimer, the term of this patent is extended or adjusted under 35 U.S.C. 154(b) by 0 days.

(21) Appl. No.: 09/178,808

(22) Filed: Oct. 26, 1998

(30) Foreign Application Priority Data

Oct. 28, 1997 (JP) .............................. 9-295745

(51) Int. Cl.[7] .................................. H04L 9/00
(52) U.S. Cl. ..................................... 713/200
(58) Field of Search .................. 713/193, 189, 713/194

(56) References Cited

U.S. PATENT DOCUMENTS

| | | | | |
|---|---|---|---|---|
| 4,691,350 A | * | 9/1987 | Kleijne et al. ................. | 380/3 |
| 4,971,444 A | * | 11/1990 | Kato ........................... | 356/375 |
| 5,027,397 A | * | 6/1991 | Double et al. ................. | 380/4 |
| 5,691,697 A | * | 11/1997 | Carvalho et al. ............. | 340/544 |
| 6,063,868 A | * | 5/2000 | Naarmann et al. ............ | 525/71 |

FOREIGN PATENT DOCUMENTS

| JP | 60-58738 | 4/1985 |
|---|---|---|
| JP | 3-223992 | 10/1991 |

OTHER PUBLICATIONS

Microsoft Press: Computer Dictionary: 1994 Microsoft Press. Redmond, Washington. 2$^{nd}$ Edition, p. 128.*
Merriam–Webster's Collegiate Dictionary: 1999 Merriam–Webster, Inc. Springfield, Massachusetts. 10$^{TH}$ Edition, p. 338.*

Japanese Office Action issued Mar. 8, 2000 in a related application with English translation of relevant portions.

* cited by examiner

Primary Examiner—Gail Hayes
Assistant Examiner—Leynna Ha
(74) Attorney, Agent, or Firm—Dickstein, Shapiro, Morin & Oshinsky, LLP.

(57) ABSTRACT

In a data secret protecting system received in a casing, a data holding memory device holds important data. A distortion detecting device detects a distortion value of the casing to produce a detected distortion value. An important data controlling device compares the detected distortion value with a reference distortion value to produce a compared distortion signal when the detected distortion value is greater than the reference distortion value. The important data controlling device erases, in response to the compared distortion signal, the important data. The data secret protecting system may comprise a temperature measuring device which measures a temperature value of the case to produce a measured temperature value. In this event, the important data controlling device corrects, in response to the measured temperature value, the detected distortion value to produce a corrected value of the detected distortion value. In addition, the important data controlling device compares the corrected value of the detected distortion value with the reference distortion value to produce a compared distortion signal when the corrected value of the detected distortion value is greater than the reference distortion value.

13 Claims, 3 Drawing Sheets

DATA PROTECTING SYSTEM AND METHOD FOR PROTECTING DATA

BACKGROUND OF THE INVENTION

This invention relates to a data secret protecting system and a method which protects important data to be held by a data holding device such as an encoding device and an accounting device.

DESCRIPTION OF THE RELATED ART

A conventional data holding device comprises a microswitch which is placed on a cover of a case which receives the conventional data holding device. The microswitch detects opening of the cover of the case.

However, the conventional data holding device has a disadvantage in that the microswitch can not detect opening of the case when a part excepting the cover of the case is opened. Namely, the conventional data holding device has a disadvantage in that the conventional data holding device is incapable of securely protecting an important data secret to be held by the conventional data holding device.

SUMMARY OF THE INVENTION

It is therefore an object of this invention to provide a data secret protecting system and a method which are capable of securely protecting an important data secret.

Other objects of this invention will become clear as the description proceeds.

According to a first aspect of this invention, there is provided to a data secret protecting system comprising:
  data holding means received in a case for holding important data;
  distortion detecting means received in the case for detecting a distortion value of the case to produce a detected distortion value;
  distortion comparing means connected to the distortion detecting means for comparing the detected distortion value with a reference distortion value to produce a compared distortion signal when the detected distortion value is greater than the reference distortion value; and
  data erasing means connected to the data holding means and to the distortion comparing means for erasing the important data of the data holding means when the data erasing means is supplied with the compared distortion signal.

According to a second aspect of this invention, there is provided to a data secret protecting system comprising:
  data holding means received in a case for holding important data;
  distortion detecting means received in the case for detecting a distortion value of the case to produce a detected distortion value;
  temperature measuring means received in the case for measuring a temperature value of the case to produce a measured temperature value;
  distortion correcting means connected to the distortion detecting means and to the temperature measuring means for correcting, in response to the measured temperature value, the detected distortion value to produce a corrected value of the detected distortion value;
  distortion comparing means connected to the distortion detecting means for comparing the corrected value of the detected distortion value with a reference distortion value to produce a compared distortion signal when the corrected value of the detected distortion value is greater than the reference distortion value; and
  data erasing means connected to the data holding means and to the distortion comparing means for erasing the important data of the data holding means when the data erasing means is supplied with the compared distortion signal.

According to a third aspect of this invention, there is provided to a data secret protecting system comprising:
  data holding means received in a case for holding important data;
  distortion detecting means received in the case for detecting a distortion value of the case to produce a detected distortion value;
  temperature measuring means received in the case for measuring a temperature value of the case to produce a measured temperature value;
  reference distortion correcting means connected to the temperature measuring means for correcting, in response to the measured temperature value, a reference distortion value to produce a corrected value of the reference distortion value;
  distortion comparing means connected to the distortion detecting means for comparing the detected distortion value with the corrected value of the reference distortion value to produce a compared distortion signal when the detected distortion value is greater than the corrected value of the reference distortion value; and
  data erasing means connected to the data holding means and to the distortion comparing means for erasing the important data of the data holding means when the data erasing means is supplied with the compared distortion signal.

According to a fourth aspect of this invention, there is provided to a data secret protecting method comprising:
  a step of holding important data in a case;
  a step of detecting a distortion value of the case to produce a detected distortion value;
  a step of comparing the detected distortion value with a reference distortion value to produce a compared distortion signal when the detected distortion value is greater than the reference distortion value; and
  a step of erasing, in response to the compared distortion signal, the important data.

According to a fifth aspect of this invention, there is provided to a data secret protecting method comprising:
  a step of holding important data in a case;
  a step of detecting a distortion value of the case to produce a detected distortion value;
  a step of measuring a temperature value of the case to produce a measured temperature value;
  a step of correcting, in response to the measured temperature value, the detected distortion to produce a corrected value of the detected distortion value;
  a step of comparing the corrected value of the detected distortion value with a reference distortion value to produce a compared distortion signal when the corrected value of the detected distortion value is greater than the reference distortion value; and
  a step of erasing, in response to the compared distortion signal, the important data.

According to a sixth aspect of this invention, there is provided to a data secret protecting method comprising:

a step of holding important data in a case;

a step of detecting a distortion value of the case to produce a detected distortion value;

a step of measuring a temperature value of the case to produce a measured temperature value;

a step of correcting, in response to the measured temperature value, a reference distortion value to produce a corrected value of the reference distortion value;

a step of comparing the detected distortion value with the corrected value of the reference distortion value to produce a compared distortion signal when the detected distortion value is greater than the corrected value of the reference distortion value; and a step of erasing, in response to the compared distortion signal, the important data.

DESCRIPTION OF THE PREFERRED EMBODIMENTS

Figure 1:
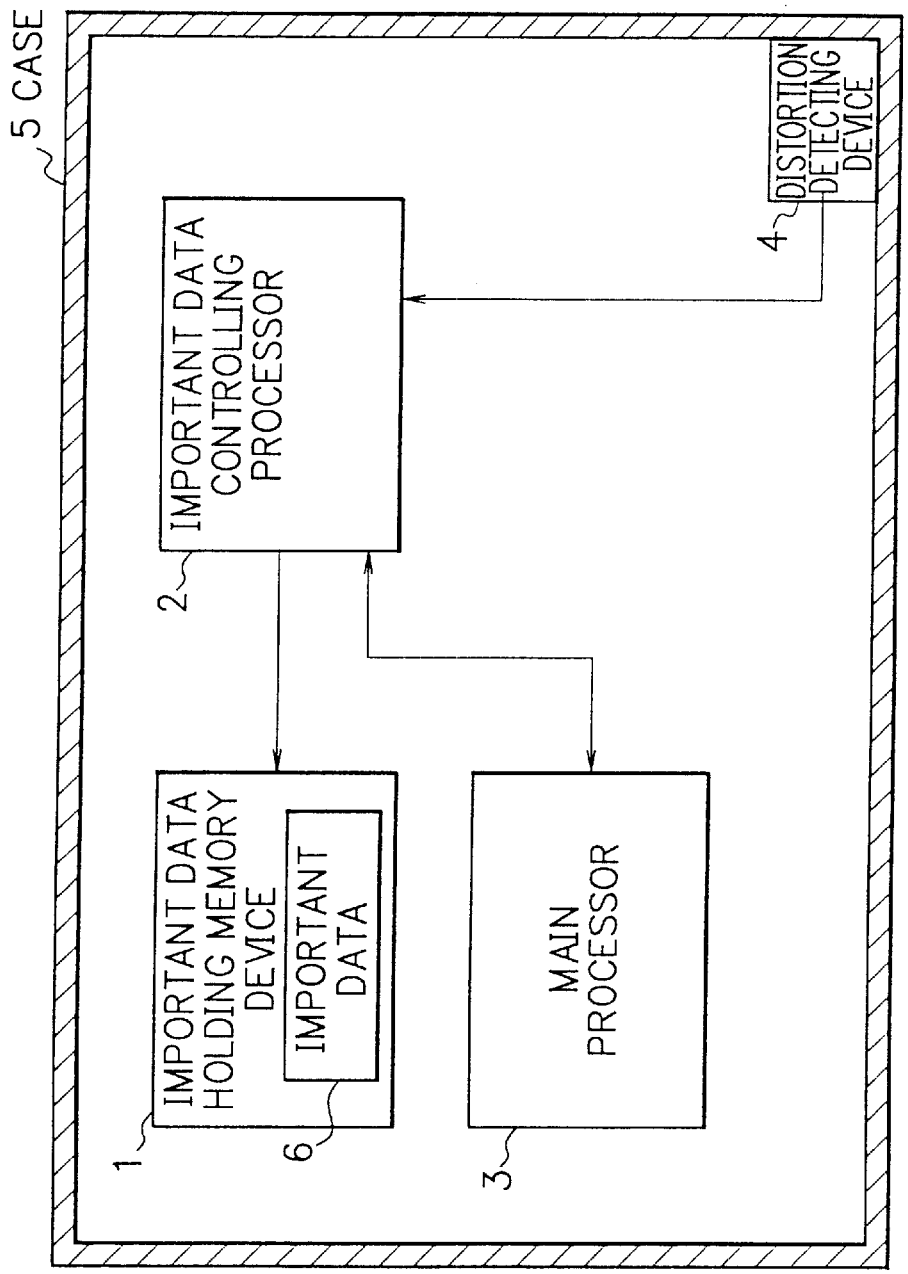
FIG. 1 is a block diagram of a data secret protecting system according to a first embodiment of this invention.

Referring to FIG. 1, a description will be provided for a data secret protecting system according to a first embodiment of this invention. The data secret protecting system comprises an important data holding memory device 1, an important data controlling processor 2, a main processor 3, and a distortion detecting device 4. The data secret protecting system is received in a case 5. The important data holding memory device 1 holds an important data 6. The important data controlling processor 2 is connected to important data holding memory device 1, the main processor 3, and the distortion detecting device 4. The case 5 has four side planes. The distortion detecting device 4 is positioned so that the distortion detecting device 4 is in contact with two of the side planes of the case 5 that are adjacent.

The important data holding memory device 1 is implemented by a memory device in which data is able to be erased. The important data controlling processor 2 controls the important data holding memory device 1. The important data controlling processor 2 executes holding of the important data 6, erasing of the important data 6, and collating of a password at a time of accessing to the important data 6.

Also, the important data controlling processor 2 is supplied with a detected distortion value from the distortion detecting device 4. The important data controlling processor 2 compares the detected distortion value with a reference distortion value to produce a compared distortion signal when the detected distortion value is greater than the reference distortion value. The reference distortion value is set at a minimum distortion value of a forecasted distortion value which is produced upon an unauthorized opening of the case 5. Therefore, the important data controller processor 2 can recognize an unauthorized opening of the case 5 when the detected distortion value is greater than the reference distortion value. The important data controlling processor 2 erases all of the important data 6 when the detected distortion value is greater than the reference distortion value so when the detected distortion value is greater than the reference distortion value so that the important data 6 cannot be taken by a third person.

The distortion detecting device 4 detects a distortion value of the case 5 to produce the detected distortion value. The distortion detecting device 4 supplies the detected distortion value to the important data controlling processor 2. The distortion detecting device 4, is implemented by a distortion electric converting element. In case of unauthorized opening of the case, 5, the case 5 is opened and broken. In this event, since the case 5 is supplied with forces, the case 5 is distorted. Therefore, the distortion detecting device 4 detects the distortion value of the case 5 to produce and supply the detected distortion value to the important data controlling processor 2.

The main processor 3 executes, by a predetermined procedure, processes of the whole system which includes the data secret protecting system. In case that the system comprises an encoding device, the main processor 3 executes encoding and cryptoanalysis. The main processor 3 executes collating of the important data 6 through the important data controlling processor 2 when the main processor 3 needs to collate the important data 6.

Figure 2:
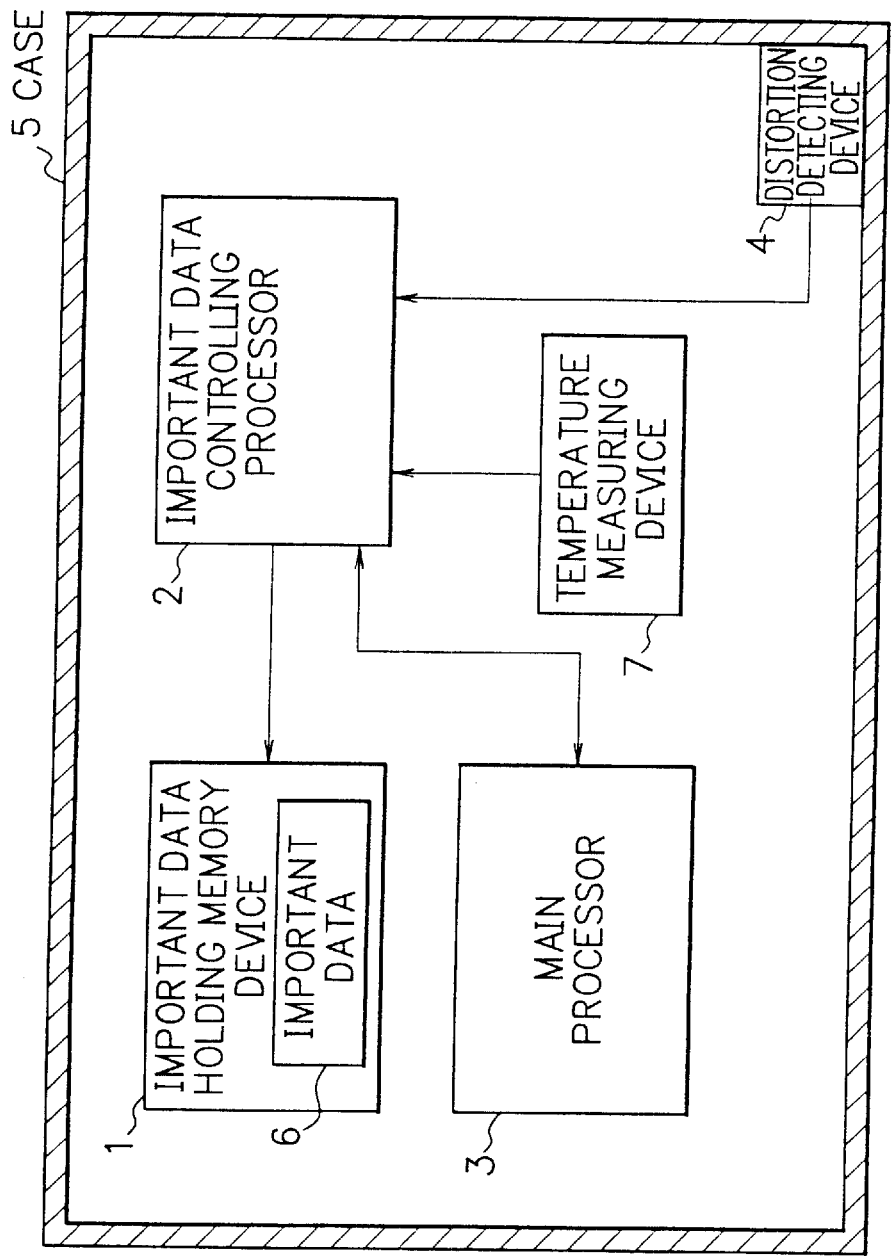
FIG. 2 is a block diagram of a data secret protecting system according to a second embodiment of this invention.

Referring to FIG. 2, the description will proceed to a data secret protecting system according to a second embodiment of this invention. Similar parts are designated by like reference numerals.

In FIG. 2, the data secret protecting system further comprises a temperature measuring device 7. Namely, the data secret protecting system comprises the important data holding memory device 1, the important data controlling processor 2, the main processor 3, the distortion detecting device 4, and the temperature measuring device 7. The data secret protecting system is received in the case 5. The temperature measuring device 7 is connected to the important data controlling processor 2.

The detected distortion value is exchanged in response to change of a temperature value of the case 5. Therefore, the temperature measuring device 7 measures the temperature value of the case 5 to produce a measured temperature value. The temperature measuring device 7 supplies the measured temperature value to the important data controlling processor 2. The important data controlling processor 2 corrects, in response to the measured temperature value, the detected distortion value to produce a corrected value of the detected distortion value. The important data controlling processor 2 compares the corrected value of the detected distortion value with the reference distortion value to produce a compared distortion signal when the corrected value of the detected distortion value is greater than the reference distortion value. The important data controlling processor 2 erases, in response to the compared distortion signal, the important data 6 of the important data holding memory device 1.

In addition, the important data controlling processor 2 may correct, in response to the measured temperature value, the reference distortion value to produce a corrected value of the reference distortion value. In this event, the important data controlling processor 2 compares the detected distortion value with the corrected value of the reference distortion value to produce the compared distortion signal when the detected distortion value is greater than the corrected value of the reference distortion value. The important data controlling processor 2 erases, in response to the compared distortion signal, the important data 6 of the important data holding memory device 1.

Figure 3:
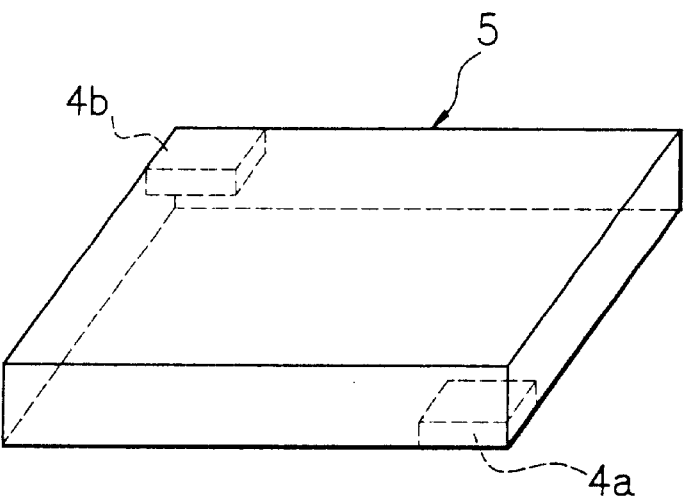
FIG. 3 is a schematic perspective view of a part of a data secret protecting system according to a third embodiment of this invention.

Referring to FIG. 3, the description will proceed to a data secret protecting system according to a third embodiment of this invention. Similar parts are designated by like reference numerals.

In FIG. 3, the data secret protecting system comprises first and second distortion detecting devices 4a and 4b which are connected to the important data controlling processor 2. Namely, the data secret protecting system comprises the important data holding memory device 1, the important data controlling processor 2, the main processor 3, and the first and second distortion detecting devices 4a and 4b. Also, the data secret protecting system may comprise the important data holding memory device 1, the important data controlling processor 2, the main processor 3, the first and second distortion detecting devices 4a and 4b, and the temperature measuring device 7.

The first distortion detecting device 4a is positioned inside a first corner of the case 5. The second distortion detecting device 4b is positioned inside a second corner of the case 5 that is opposed to the first inside corner. The first and second distortion detecting devices 4a and 4b detect first and second distortion values of the case 5 to produce first and second detected distortion values. The first and second distortion detecting devices 4a and 4b supply the first and second detected distortion values to the important data controlling processor 2. The important data controlling processor 2 compares the first and second detected distortion values with the reference distortion value to produce a compared distortion signal when at least one of the first and second detected distortion values is greater than the reference distortion value.

In addition, the important data controlling processor 2 may correct, in response to the measured temperature value, the first and second detected distortion values to produce first and second corrected values of the first and second detected distortion values. The important data controlling processor 2 compares the first and second corrected values of the first and second detected distortion values with the reference distortion value to produce the compared distortion signal when one of the first and second corrected values of the first and second detected distortion values is greater than the reference distortion value.

Also, the important data controlling processor 2 may correct, in response to the measured temperature value, the reference distortion value to produce the corrected value of the reference distortion value. In this event, the important data controlling processor 2 compares the first and second detected distortion values with the corrected value of the reference distortion value to produce the compared distortion signal when one of the first and second detected distortion values is greater than the corrected value of the reference distortion value.

Figure 4:
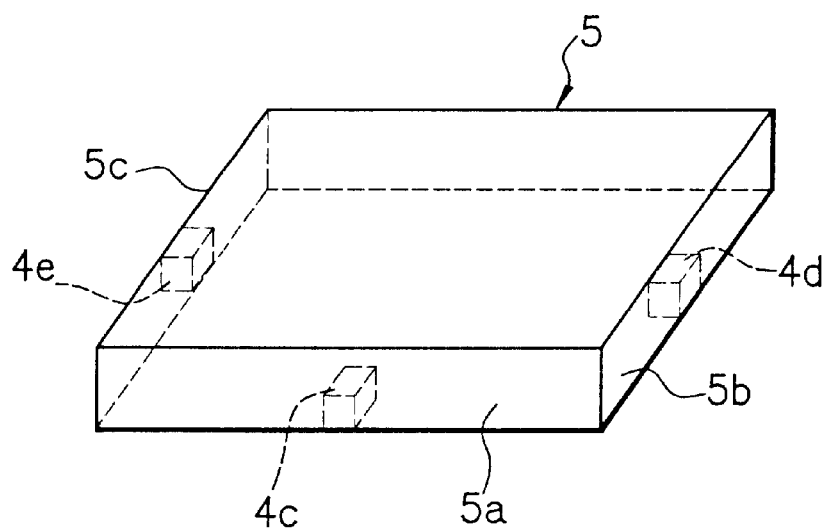
FIG. 4 is a schematic perspective view of a part of a data secret protecting system according to a fourth embodiment of this invention.

Referring to FIG. 4, the description will proceed to a data secret protecting system according to a fourth embodiment of this invention. Similar parts are designated by like reference numerals.

In FIG. 4, the data secret protecting system comprises first, second, and third distortion detecting devices 4c, 4d, and 4e which are connected to the important data controlling processor 2. Namely, the data secret protecting system comprises the important data holding memory device 1, the important data controlling processor 2, the main processor 3, and the first through third distortion detecting devices 4c to 4e. Also, the data secret protecting system may comprise the important data holding memory device 1, the important data controlling processor 2, the main processor 3, the first through third distortion detecting devices 4c to 4e, and the temperature measuring device 7.

The first through third distortion detecting devices 4c to 4e are positioned so that the first through third distortion detecting devices 4c to 4e are in contact with first, second, and third side planes 5a, 5b, and 5c of the case 5. The first through third distortion detecting devices 4c to 4e detect first through third distortion values of the case 5 to produce first through third detected distortion values. The first through third distortion detecting devices 4c to 4e supply the first through third detected distortion values to the important data controlling processor 2. The important data controlling processor 2 compares the first through third detected distortion values with the reference distortion value to produce a compared distortion signal when at least one of the first through third detected distortion values is greater than the reference distortion value.

In addition, the important data controlling processor 2 may correct, in response to the measured temperature value, the first through third detected distortion values to produce first through corrected values of the first through third detected distortion values. The important data controlling processor 2 compares the first through third corrected values of the first through third detected distortion values with the reference distortion value to produce the compared distortion signal when one of the first through third corrected values of the first through third detected distortion values is greater than the reference distortion value.

Also, the important data controlling processor 2 may correct, in response to the measured temperature value, the reference distortion value to produce the corrected value of the reference distortion value. In this event, the important data controlling processor 2 compares the first through third detected distortion values with the corrected value of the reference distortion value to produce the compared distortion signal when one of the first through third detected distortion values is greater than the corrected value of the reference distortion value.

In addition, the important data holding memory device 1 is implemented by a S-RAM in which backup is executed by a battery. This is because it is necessary to hold the important data 6 when a system power supply is OFF. Also, since it is necessary to detect opening of the case 5 when the system power supply is OFF, the important data controlling processor 2 and the temperature measuring device 7 are implemented by elements which is operated by the battery. Also, the distortion detecting devices 4, 4a, 4b, 4c, 4d, and 4e are implemented by piezoelectric elements.

According to this invention, it is possible to detect opening of the case that is not detected by the microswitch.

What is claimed is:

1. A data secret protecting system comprising:
   data holding means received in a case for holding data, said case having inner surfaces;
   distortion detecting means disposed on less than all of said inner surfaces inside said case at a discrete location for detecting a distortion value of said case to produce a detected distortion value;
   distortion comparing means connected to said distortion detecting means for comparing said detected distortion value with a reference distortion value to produce a compared distortion signal when said distortion value is greater than said reference distortion value; and
   data erasing means connected to said data holding means and to said distortion comparing means for erasing said data held in said holding means when said data erasing means is supplied with said compared distortion signal.

2. A data secret protecting system as claimed in claim 1, wherein said distortion detecting means comprises a distortion electric converting element.

3. A data secret protecting system comprising:

data holding means received in a case for holding data;

distortion detecting means disposed in said case for detecting a distortion value of said case to produce a detected distortion value;

temperature measuring means received in said case for measuring a temperature value of said case to produce a measured temperature value;

distortion correcting means connected to said distortion detecting means and to said temperature measuring means for correcting, utilizing said measured temperature value, said detected distortion value to calculate corrected value of said detected distortion value;

distortion comparing means connected to said distortion detecting means for comparing said corrected value of said detected distortion value with a reference distortion value to produce a compared distortion signal when said corrected value of said detected distortion value is greater than said reference distortion value; and data erasing means connected to said data holding means and to said distortion comparing means for erasing said data held in said data holding means when said data erasing means is supplied with said compared distortion signal.

4. A data secret protecting system as claimed in claim 3, wherein said distortion detecting means comprises a distortion electric converting element.

5. A data secret protecting system comprising:

data holding means received in a case for holding data;

distortion detecting means disposed in said case for detecting a distortion value of said case produce a detected distortion value;

temperature measuring means received in said case for measuring a temperature value of said case to produce a detected distortion value;

reference distortion correcting means connected to said temperature measuring means for correcting utilizing said measured temperature value, a reference distortion value to calculate a corrected value of said reference distortion value;

distortion comparing means connected to said distortion detecting means for comparing said detected distortion value with said corrected value of said reference distortion value to produce a compared distortion signal when said distortion value is greater than said corrected value to a produce compared distortion signal when said detected distortion value is greater than said corrected value of said reference distortion value; and data erasing means connected to said data holding means and to said distortion comparing means for erasing said data held in said data holding means when said data erasing means is supplied with said compared distortion signal.

6. A data secret protecting system as claimed in claim 5, wherein said distortion detecting means comprises a distortion electric converting element.

7. A data secret protecting method comprising the steps of:

holding data in a case, said case having inner surfaces detecting a distortion value of said case with a distortion detector disposed on less than all of said surfaces at a discrete location inside said case to produce a detected distortion value;

comparing said detected distortion value with a reference distortion value to produce a compared distortion signal when said detected distortion value is greater than said reference distortion value; and erasing, in response to said compared distortion signal, said data.

8. A data secret protecting method comprising the steps of holding data in the case;

detecting a distortion value of said case to produce a detected distortion value;

measuring a temperature value of said case to produce a measured temperature value;

correcting, utilizing said measured temperature value, said detected distortion value to calculate a corrected value of said detected distortion value;

comparing said corrected value of said detected distortion value with a reference distortion value to produce a compared distortion signal when said corrected value of said detected distortion value is greater than said reference distortion value, and erasing, in response to said compared distortion signal, said data.

9. A data secret protecting method comprising the steps of:

holding data in a case;

detecting a distortion value of said case to produce a detected distortion value;

measuring a temperature value of said case to produce a detected distortion value;

correcting, utilizing said measured temperature value, a reference distortion value to calculate a corrected value of said reference distortion value;

a comparing said detected distortion value with said corrected value of said reference distortion value to produce a compared distortion signal when said detected distortion value is greater than said corrected value of said reference distortion value, and erasing, in response to said compared distortion signal, said data.

10. A data secret protecting system as claimed in claim 1, wherein the distortion detecting means includes a distortion detecting device disposed inside said case in contact with at least two surfaces thereof.

11. A data secret protecting system as claimed in claim 1, wherein the distortion detecting means includes a plurality of distortion detecting devices each disposed inside said case in contact with at least two surfaces, the two surfaces contacted by each respective distortion detecting device having at least one surfaces different than at least one surfaces contacted by each of the remaining distortion detecting devices.

12. A data secret protecting system for use with a case, the case having inner surfaces, the system comprising:

a memory received in said case;

a distortion detector disposed on less than all of said inner surfaces inside said case at a discrete location, said distortion detector detecting a distortion value of said case to produce a detected distortion value;

a distortion comparator connected to said distortion detector, said distortion comparator comparing said detected distortion value with a reference distortion value to produce a compared distortion signal when said distortion value is greater than said reference distortion value; and a data eraser connected to said memory and to said distortion comparator, said data eraser erasing said data held in said memory when said data eraser is supplied with said compared distortion signal.

13. A data secret protecting system for use with a case, the case having inner surfaces, the system comprising:

a memory received in said case;

a distortion detector disposed in said case, said distortion detector detecting a distortion value of said case to produce a detected distortion value;

a temperature measurer received in said case, said temperature measurer measuring a temperature value of said case to produce a measured temperature value;

a distortion corrector connected to said distortion detector and to said temperature measurer, said distortion corrector correcting, utilizing said measured temperature value, said detected distortion value to calculate a corrected value of said detected distortion value;

a distortion comparator connected to said distortion detector, said distortion comparator comparing said corrected value of said detected distortion value with a reference distortion value to produce a compared distortion signal when said corrected value of said detected distortion value is greater than said reference distortion value; and a data eraser connected to said memory and to said distortion comparator, said data eraser erasing said data held in said memory when said data eraser is supplied with said compared distortion signal.

* * * * *